United States Patent [19]

Kunz

[11] Patent Number: 4,674,582
[45] Date of Patent: Jun. 23, 1987

[54] PLATFORM-TYPE SCALE

[75] Inventor: Peter Kunz, Gossau, Switzerland

[73] Assignee: Mettler Instrumente AG, Greifensee, Switzerland

[21] Appl. No.: 764,843

[22] Filed: Aug. 9, 1985

[30] Foreign Application Priority Data

Aug. 17, 1984 [CH] Switzerland .................. 3953/84

[51] Int. Cl.⁴ .................. G01G 21/08; G01G 7/00
[52] U.S. Cl. ...................... 177/256; 177/212
[58] Field of Search .................. 177/256–259, 177/212

[56] References Cited

U.S. PATENT DOCUMENTS

| | | | |
|---|---|---|---|
| 3,931,860 | 1/1976 | Czyryk | 177/257 |
| 4,189,018 | 2/1980 | Brouwer | 177/256 |
| 4,276,949 | 7/1981 | Knothe et al. | 177/212 |
| 4,381,826 | 5/1983 | Kupper | 177/256 |

Primary Examiner—George H. Miller, Jr.
Attorney, Agent, or Firm—Erwin S. Teltscher

[57] ABSTRACT

A scale of the platform type includes a base frame, a lever mechanism for force-transmission connected to the base frame, and including a plurality of two-armed levers, a weighing platform supported by the two-armed levers, a measurement transducer disposed within the base frame and adapted for generating signals substantially proportional to a weight placed on the weighing platform, and a movable load-carrying frame surrounding the base frame, and wherein each two-armed lever is pivoted on the base frame. This concept permits attainment of scales of very low height, hardly sensitive to corner loads, namely loads offset from the center of the scale, and which have a high degree of resolution. The scale may be used for precision weighing, and may have a load region e.g. within a range from about 10 kg to about 100 kg.

8 Claims, 6 Drawing Figures

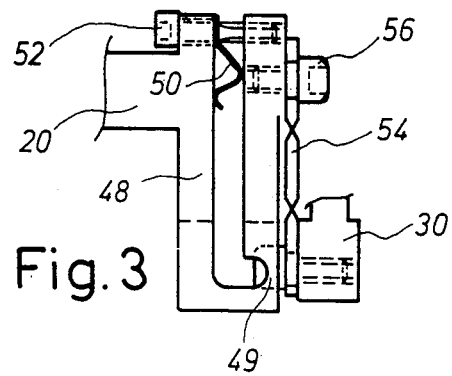
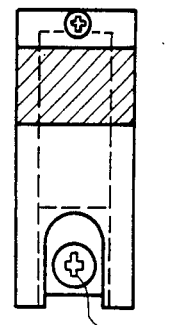
Fig. 3    Fig. 4
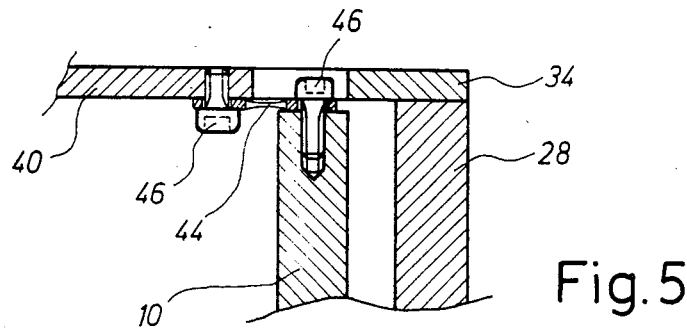
Fig. 5
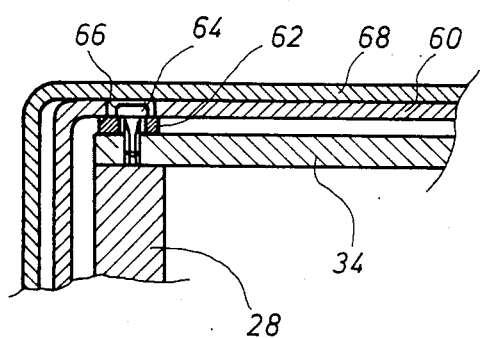
Fig. 6

PLATFORM-TYPE SCALE

BACKGROUND OF THE INVENTION

The invention relates to a scale of the platform type having a rigid base frame, lever means for force-transmission, a weighing platform supported by the lever means, and a measurement transducer disposed within the base frame for generating signals substantially proportional to a weight placed on the weighing platform.

DESCRIPTION OF THE PRIOR ART

Scales of this type are known in various implementations. They are normally intended for weighing regions within about 10 kg to about 100 kg. Scales known hitherto have a rigid carrier or base frame, within which there are disposed the lever means and the measurement transducer, or transducers. Mostly strain gage measurement cells are used, but there are also employed transducers operating along different principles, for example cells having oscillating strings, or cells using electromagnetic force compensation. The display of weight is mostly arranged separately, so as not to impair loading of the weighing platform.

Examples of such known scales are described, for example, in U.S. Pat. Nos. 3,938,603, and 4,315,554, as well as in German laid open specification No. 21 56 140.

SUMMARY OF THE INVENTION

It is an object of the present invention to devise a scale of the aforedescribed kind having a lower sensitivity with respect to any off-center loading, or a reduced corner-load sensitivity, while simultaneously endeavoring to attain a scale of a small height, which also has a high resolution of the weighing result.

This object is attained, according to the present invention, by the lever means including a plurality of two-armed levers, which in turn, are pivotably arranged on a load-carrying frame surrounding the carrier or base frame. This concept permits the use of a carrier or base frame which is hard to deform, and which also has a low corner-load sensitivity, while it nevertheless permits, using given outer dimensions of the weighing platform, attainment of a relatively low height of construction, and of a maximum possible lever length, and hence achievement of a large force-transmission ratio.

In a preferred embodiment the lever means assumes the general shape of a T, and includes three levers, which are pivotably arranged on a common coupling member near the input of the measurement transducer. Here the rigid base- or carrier-frame advantageously rests on three legs, which in turn are located close to respective pivoting locations of the levers. This ensures optimum stability of the scale.

In order to adjust the corner-load sensitivity, an arrangement is advantageous, in which the lever ends facing the coupling member are provided with means for varying the effective lever length. A precise adjustment is obtained, for example, if the aforesaid arrangement includes a U-shaped member formed with a slit, whose free ends can be pressed towards one another against a force of a spring urging the free ends apart, and wherein an adjustment screw is provided to implement such an adjustment.

In a further development of the invention, the movable load-carrying frame may be closed off by a cover plate threaded thereonto, which, in turn, is formed with a recess. A plate-shaped guide member is disposed in the aforedescribed recess for guiding the movable load carrying frame; the guide member, in turn, is pivoted, on one hand, on the base frame, and, on the other hand, on the cover plate.

For a further enhancement of insensitivity to a corner-load (and consequently corner-load reliability), it is possible to arrange an equalizing member or cup between the load-carrying frame and the weighing platform, which, in turn, is supported through a multi-point support on the movable load-carrying frame. Such an equalizing member may, pursuant to a certain deformation in itself, protect the base frame from deformation in the event of any eccentric load, and thus may further reduce the corner-load sensitivity of the scale. Advantageously the support points of the equalizing member are located near respective lever pivoting locations.

In an advantageous embodiment of the invention the measurement transducer is implemented as an electromagnetically compensating force-measuring cell. A combination of such a cell with the inventive concept permits weighings of a high degree of accuracy, and consequently also a large resolution of the weighing result.

BRIEF DESCRIPTION OF THE DRAWING

The invention will be better understood with the aid of the drawing, in which:

FIG. 3 is a large-scale section along the line 2—2 of FIG. 1, and FIGS. 3–6 show various large-scale details of the scale, according to the present invention.

DESCRIPTION OF THE PREFERRED EMBODIMENTS

Figure 1:
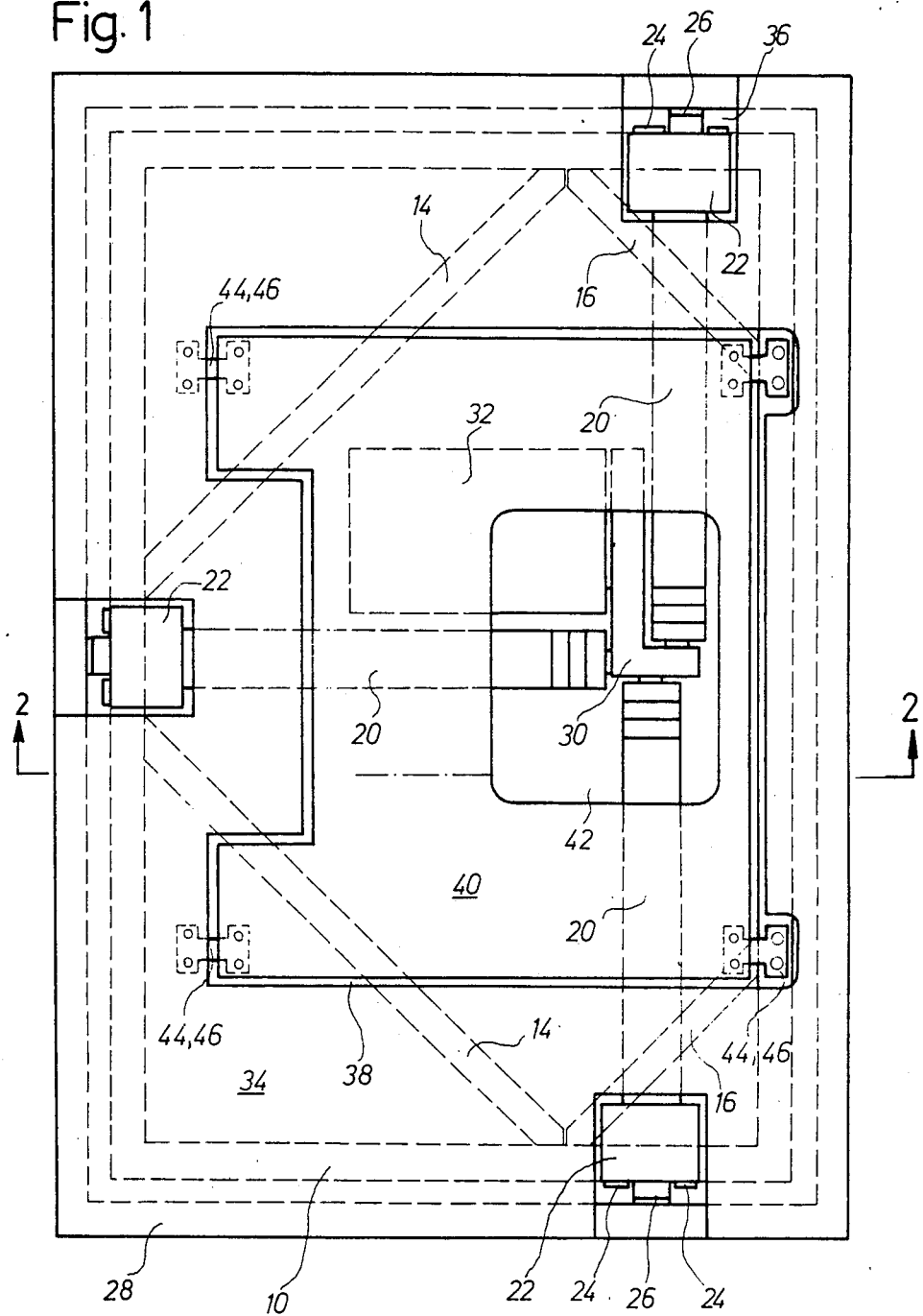
FIG. 1 is a plan view of the scale, with the weighing platform removed for clarity's sake.

Referring now to the drawing, the scale, according to the present invention, includes a rigid substantially rectangular base frame 10 having a base plate 12. Two pairs of symmetrically disposed ribs 14 and 16 are provided to reinforce the base frame 10. The aforesaid elements are advantageously cast in metal so as to form a single-piece member, which rests on three legs 18. The legs 18 are mounted near respective lever pivoting locations, which will be described in detail later.

Figure 2:
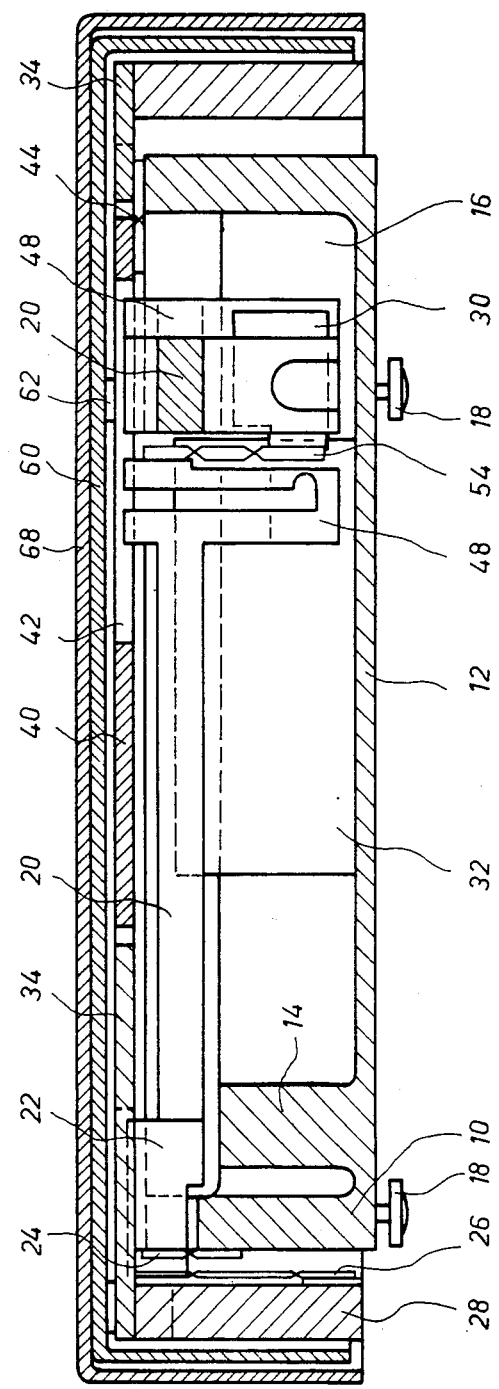

The lever means includes three identical two-armed levers 20, which are distributed in a T-shaped manner. On the load side each lever 20 includes an end portion 22. Each end portion 22 is connected through two respective bendable hinges 24 with the base frame 10. A further bendable hinge 26 serving as a tensile support connects each respective end portion 22 to a load-carrying frame 28. All bendable hinges are secured to the base frame 10 by means of screws, which have not been illustrated in FIGS. 1 and 2 for the sake of clarity. The two-armed levers 20 are connected near their respective inner ends to a force-measurement cell (measurement transducer) 32 through a common coupling member 30.

Any weight-measuring means operating on a small travel principle can basically be used in the measurement transducer, such as cells having oscillating strings, or strain gages. For reasons of a high-degree of precision of weighing, which has already been mentioned, an electromagnetically operating, force-compensating transducer is preferred here, the construction and operation of which is known, and which therefore requires no further explanation within the scope of the present invention. For the same reasons, illustration of the conventional (digital) weight display can be dispensed with also.

The load carrying frame 28 is also rectangular in shape. It surrounds the rigid base frame 10, and is movably arranged along the direction of the load, namely along the vertical direction. An upper cover plate 34 is threaded-on to the frame 28 by means of (non-illustrated) screws. The load-carrying frame 28 is formed with three recesses 36 on those locations, where the lever end portions are articulatably connected to the base frame 10, so as to minimize the height of the scale. There is furthermore provided on the frame 28 a large center opening, a plate-shaped guide member 40 fitting with play into the opening.

The plate-shaped guide member 40, in turn, is formed with a rectangularly shaped opening 42, which permits access to the lever ends at the coupling member 30. The plate-shaped guide member 40 is connected to the rigid base frame 10 by means of two bendable hinges 44 (see screws 46 shown in FIG. 5). On an opposite side two further threaded-on bendable hinges 44 form a connection to the upper cover plate 34.

A U-shaped inner end piece 48 formed with a bendable portion 49 is associated with each lever 20. The end pieces 48 may either be formed in one piece with a respective lever 20, or they may constitute separate respective end pieces threaded-on to respective levers 20. Both legs of each U-shaped end piece 48 are spread apart by resilient means, such as a leaf spring 50, best shown in FIG. 3, in a direction so as to increase the effective length of the respective lever, thus constituting effective length varying means. Through regulating means, such as an adjustable set screw 52, the legs of the U-shaped inner end piece 48 can also be pressed towards one another against the spring force for a fine adjustment of the effective lever length, and consequently for an adjustment of the sensitivity with respect to a load located at a corner. Each U-shaped inner end piece 48 has a fixed leg and a movable leg, a hinge 54 being attached to the movable leg by means of a screw 56, while the hinge 54, in turn, is attached with a lower end thereof to the coupling member 30 by means of a screw 58.

An intermediate or equalizing member 60 is connected to the upper cover plate 34, as can be best seen from FIG. 6, as follows: Near respective pivoting locations of the three levers on the load-carrying frame 28 there are disposed respective point-like supports or eyes 62 formed each with a bore, the point-like supports being spot-welded to the equalizing member 60. Screws 64 serve for securing the equalizing member 60 to the cover plate 34, so that a gap of several millimeters is formed between the equalizing member 60 and the cover plate 34. Here a screw-head of a respective screw 64 is received in an opening 66 of the equalizing member 60. The actual weighing platform 68 physically abuts the equalizing member 60, and surrounds the latter laterally with only a little play. During weighing any load set onto weighing platform 68 is transferred through the equalizing member 60 onto the movable frame 28. The levers 20 are pivoted, and the inner end portions 48 tend to pull the coupling member 30 upwardly. A compensating force generated within the measurement transducer 32 is opposed to the movement. In practice the levers 20 execute only a minimal pivoting movement due to the almost pathless operating principle of the electromagnetic force compensation.

If any load is set onto the weighing platform 68 eccentrically, then the equalizing member 60 is elastically deformed, until it abuts loosely at the loading location on the plate 34 of the load-carrying frame 28. In this manner in the case of any eccentric loads any deformation of the load-carrying frame 60 is eliminated to all intents and purposes, which would impair the correct functioning of the lever means, so that any corner-load error is minimized.

A scale according to the implementation example described had a measuring range of about 40 kg with an indicating resolution of 1 g. At a lever transmission ratio of 1:600 consequently only a force of about 70 g had to be provided by the compensation device of the measurement transducer. The corner-load sensitivity was less than 0.1 g per kg, corresponding to a corner-load error of about 2 g with respect to full load.

While the invention has been illustrated in preferred embodiments, it is not to be limited to the structures shown, since many variations thereof will be evident to one skilled in the art, and are intended to be encompassed in the present invention as set forth in the following claims.

I claim:

1. A scale of the platform type, comprising in combination
   a base frame,
   lever means for force-transmission including three two-armed levers pivotally connected to said base frame and arranged in a T-shaped configuration,
   a weighing platform supported by said two-armed levers,
   a measurement transducer disposed within said base frame and adapted for generating signals substantially proportional to a weight placed on said weighing platform,
   a movable load-carrying frame surrounding said base frame, each of said two-armed levers being connected to said movable frame, and
   a coupling member, each of said two-armed levers being pivotably secured to said coupling member near an input of said measurement transducer.

2. The scale as claimed in claim 1, wherein each of said two-armed levers is connected near respective ends thereof to said base frame at respective pivoting locations, and further comprising three legs secured to said base frame near respective ones of said pivoting locations.

3. The scale as claimed in claim 1, wherein each lever end facing said coupling member includes means for varying the effective length of the corresponding lever.

4. The scale as claimed in claim 3, wherein each of said effective length varying means includes a U-shaped member having two free ends, resilient means urging the free ends of said U-shaped member apart from one another, and regulating means adjustably connecting said free ends to one another, whereby said free ends can be pressed towards one another by adjustment of said regulating means.

5. The scale as claimed in claim 4, whereing said resilient means includes a spring, and said regulating means includes a set screw.

6. A scale of the platform type, comprising in combination
   a base frame,
   lever means for force-transmission including a plurality of two-armed levers pivotally connected to said base frame, a weighing platform supported by said two-armed levers, a measurement transducer disposed within said base frame and adapted for generating signals substantially proportional to a weight placed on said weighing platform, a movable load-carrying frame surrounding said base frame, each of said two-armed levers being connected to said movable frame, a cover plate threadably connected to the top of said movable load-carrying frame, and being formed with a recess, and a plate-shaped guide member disposed in said recess for guiding said movable load-carrying frame, said plate-shaped guide member being pivotably connected to said base frame and to said cover plate.

7. A scale of the platform type, comprising in combination a base frame, lever means for force-transmission including a plurality of two-armed levers pivotally connected to said base frame, a weighing platform supported by said two-armed levers, a measurement transducer disposed within said base frame and adapted for generating signals substantially proportional to a weight placed on said weighing platform, a movable load-carrying frame surrounding said base frame, each of said two-armed levers being connected to said movable frame, an equalizing member disposed between said movable load-carrying frame and said weighing platform, and multiple point-like supports disposed on said movable load-carrying frame for supporting said equalizing member.

8. The scale as claimed in claim 7, wherein each of said point-like supports is located near a respective one of said pivoting locations.

* * * * *